(12) United States Patent
Mayeaux et al.

(10) Patent No.: US 7,097,693 B1
(45) Date of Patent: Aug. 29, 2006

(54) COMBINATION DEPTH AND PHASE SEPARATION MEMBRANE FILTER

(75) Inventors: Donald P. Mayeaux, St. Amant, LA (US); Valmond J. St. Amant, III, St. Amant, LA (US)

(73) Assignee: Mayeaux Holding, LLC, Prairieville, LA (US)

( * ) Notice: Subject to any disclaimer, the term of this patent is extended or adjusted under 35 U.S.C. 154(b) by 383 days.

(21) Appl. No.: 10/631,502

(22) Filed: Jul. 31, 2003

Related U.S. Application Data

(60) Provisional application No. 60/400,736, filed on Aug. 2, 2002.

(51) Int. Cl.
B01D 53/22 (2006.01)
B01D 55/00 (2006.01)
B01D 27/14 (2006.01)
B01D 29/56 (2006.01)
B01D 36/02 (2006.01)

(52) U.S. Cl. ............... 96/9; 96/11; 96/180; 210/323.1; 210/323.2; 210/342; 210/346; 210/416.4; 210/416.5; 210/188; 55/330; 55/332; 55/488; 55/489

(58) Field of Classification Search ............ 96/9, 96/11; 55/330, 332, 488, 489
See application file for complete search history.

(56) References Cited

U.S. PATENT DOCUMENTS

| 4,360,433 | A | * | 11/1982 | Walker et al. ............ 210/484 |
| 4,437,986 | A | * | 3/1984 | Hutchins et al. .......... 210/130 |
| 4,477,345 | A | * | 10/1984 | Szlaga, Jr. ............... 210/130 |
| 5,800,597 | A | * | 9/1998 | Perrotta et al. ............ 96/9 |
| 2005/0178718 | A1 | * | 8/2005 | Geibel et al. ............. 210/456 |

FOREIGN PATENT DOCUMENTS

JP 04108589 A * 4/1992

OTHER PUBLICATIONS

Balson Series A98 Coalescer Membrane Combination Filters Brochure Bulletin PK2-15A dated 1996, 1997.

* cited by examiner

*Primary Examiner*—Krishnan S. Menon
(74) *Attorney, Agent, or Firm*—Joseph T. Regard, Ltd, (plc)

(57) ABSTRACT

A combination depth and phase separation membrane filter to remove entrained liquids and immiscible liquids from hydrocarbon liquids, protecting industrial analyzers from liquid and solid contamination, etc. The preferred embodiment of the present invention contemplates a combined phase separation membrane filter and horizontally mounted depth filter in a horizontally mounted head and bowl configuration. The system is configured specifically for horizontal mounting, specifically filter configuration and layout, with all fitting connections in the head for ease of service and compactness.

21 Claims, 7 Drawing Sheets

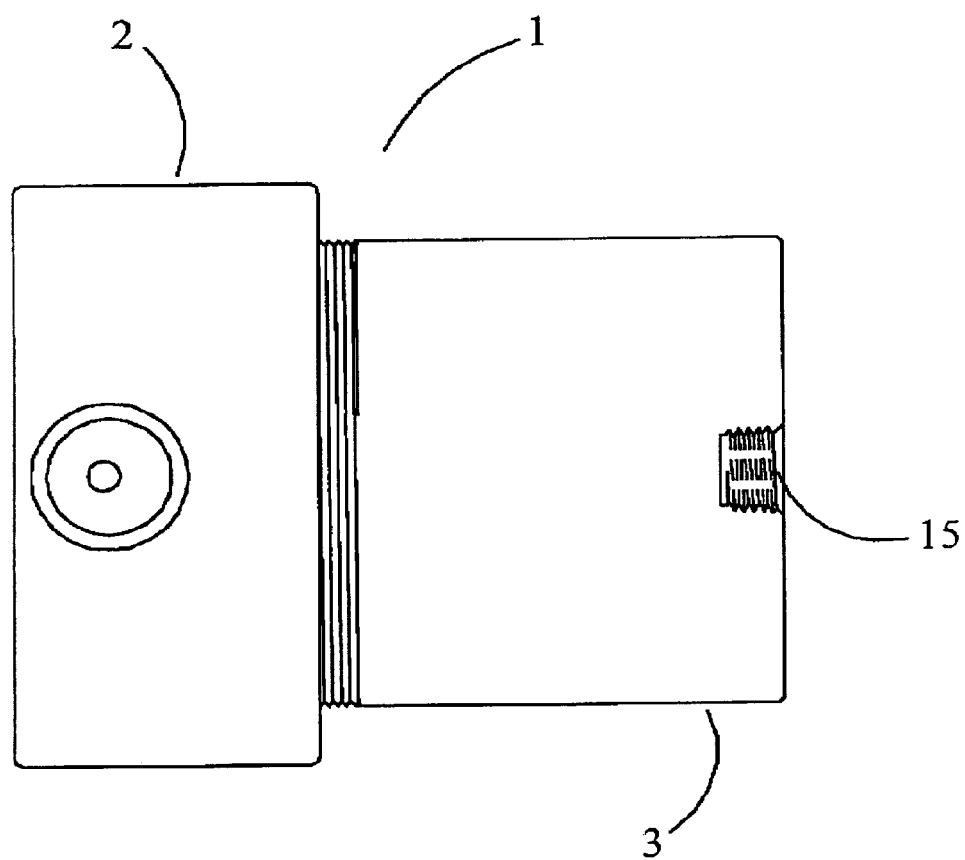
Figure# 1

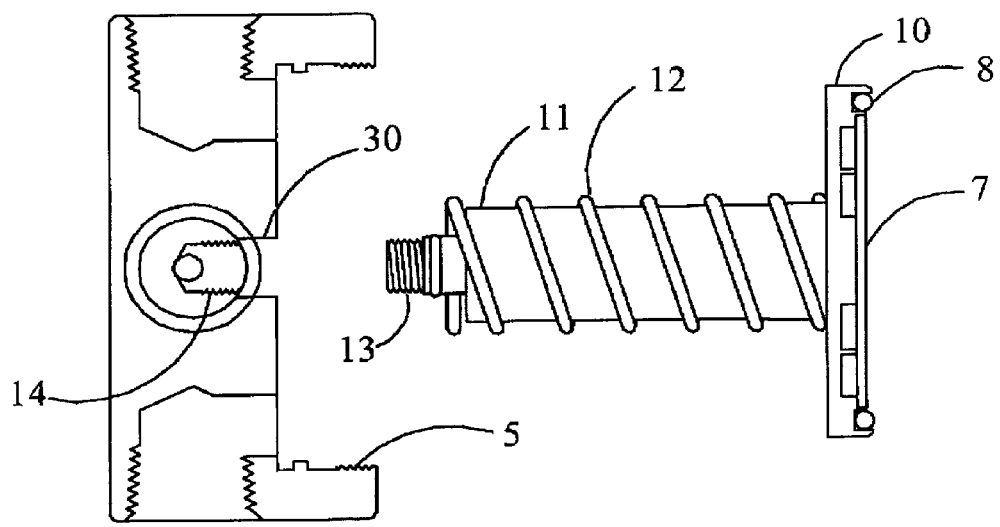
Figure# 2

Figure# 3
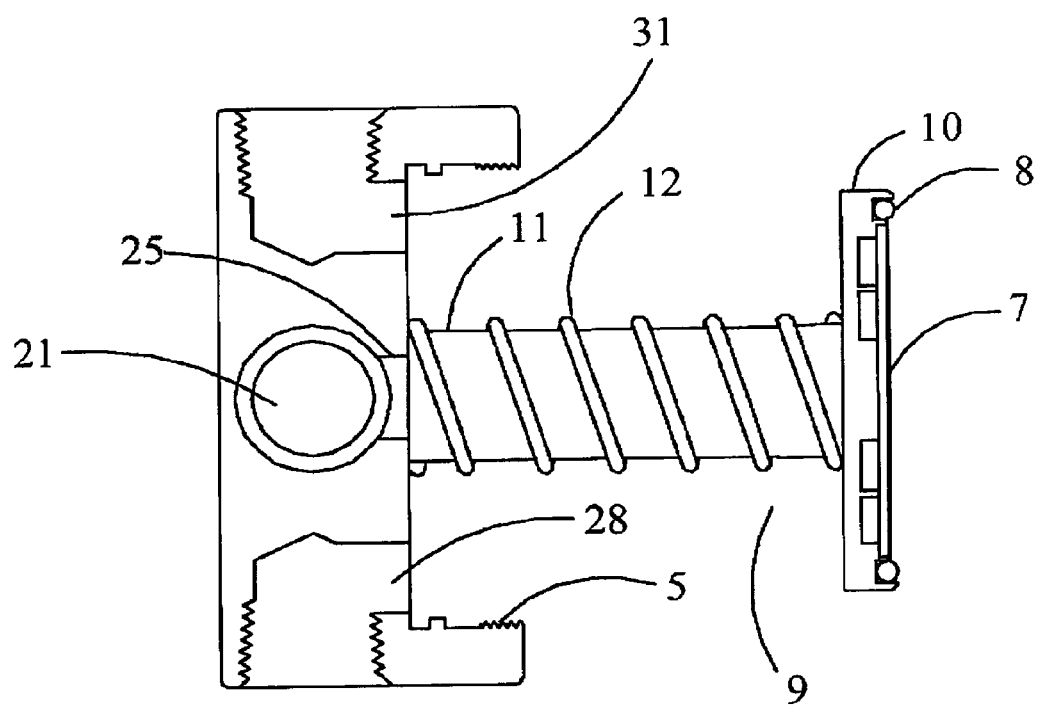

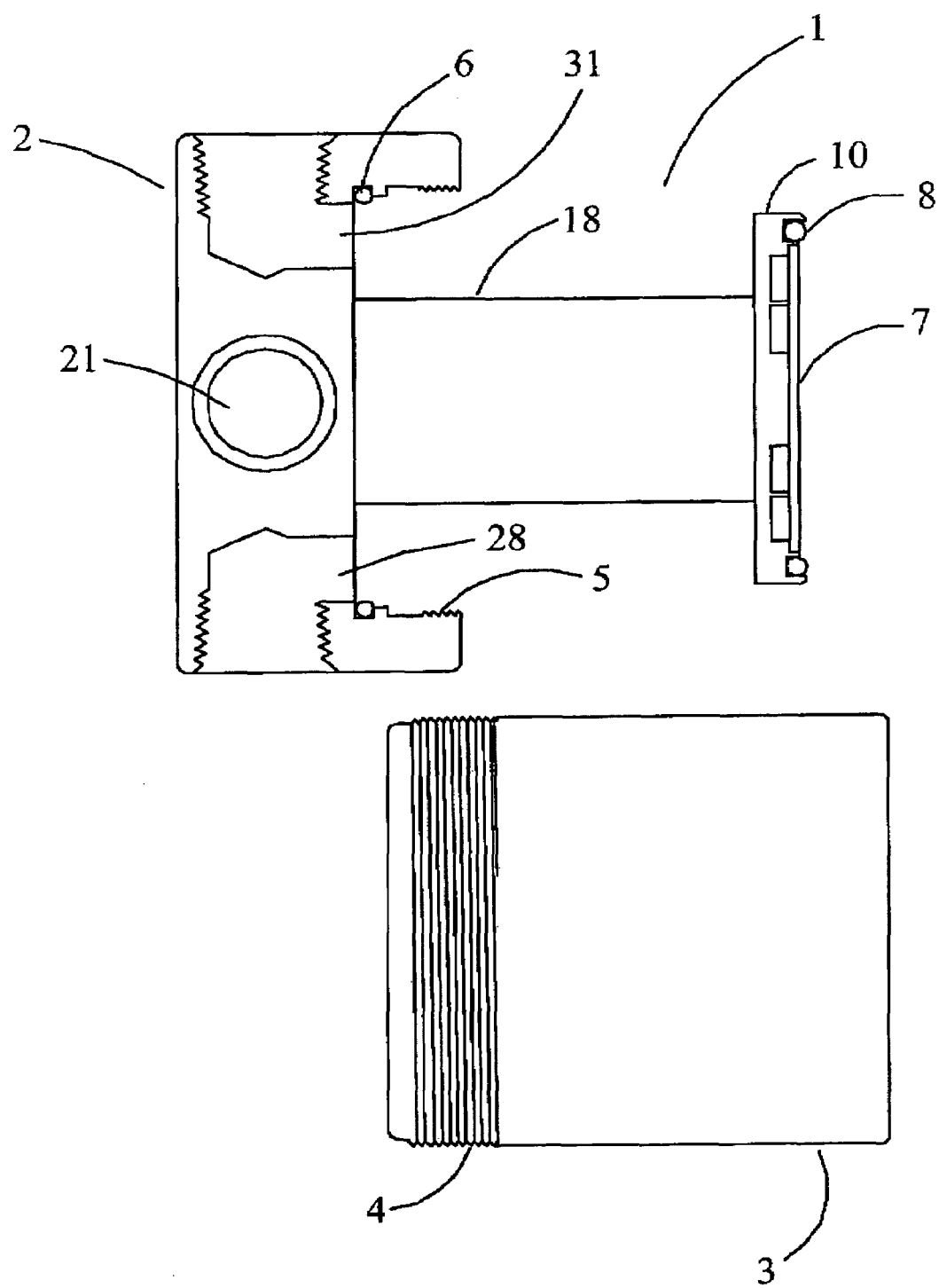
Figure# 4

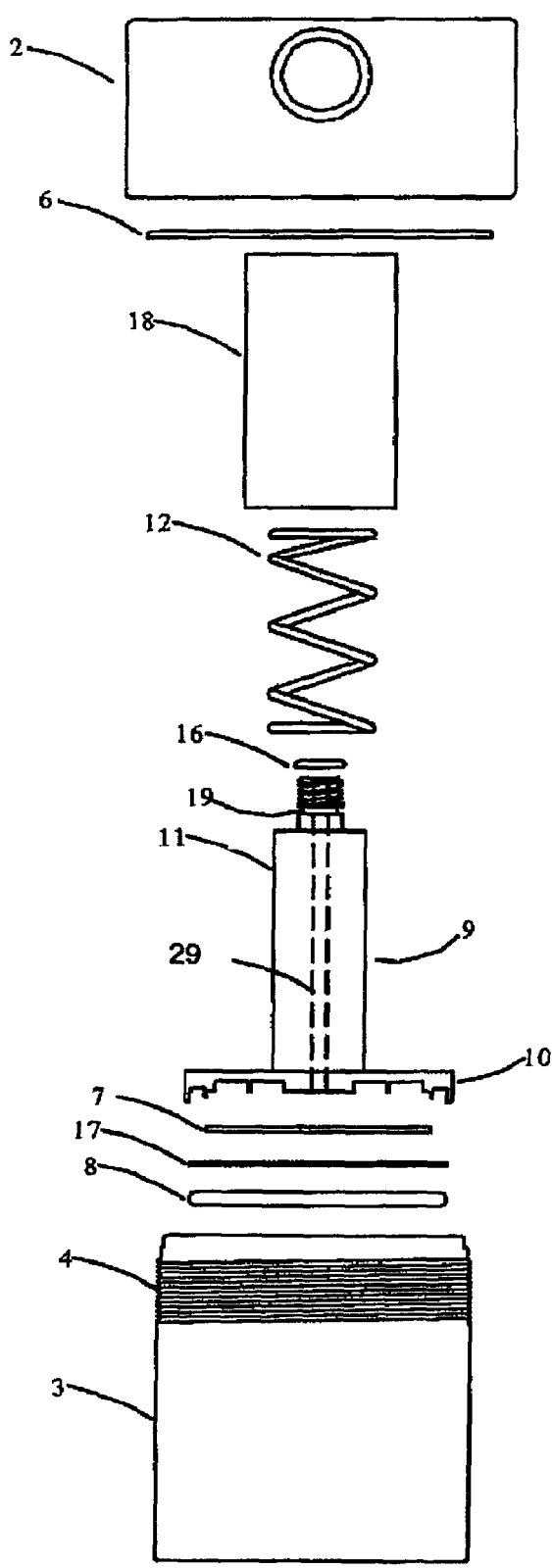
Figure# 5

Figure# 6
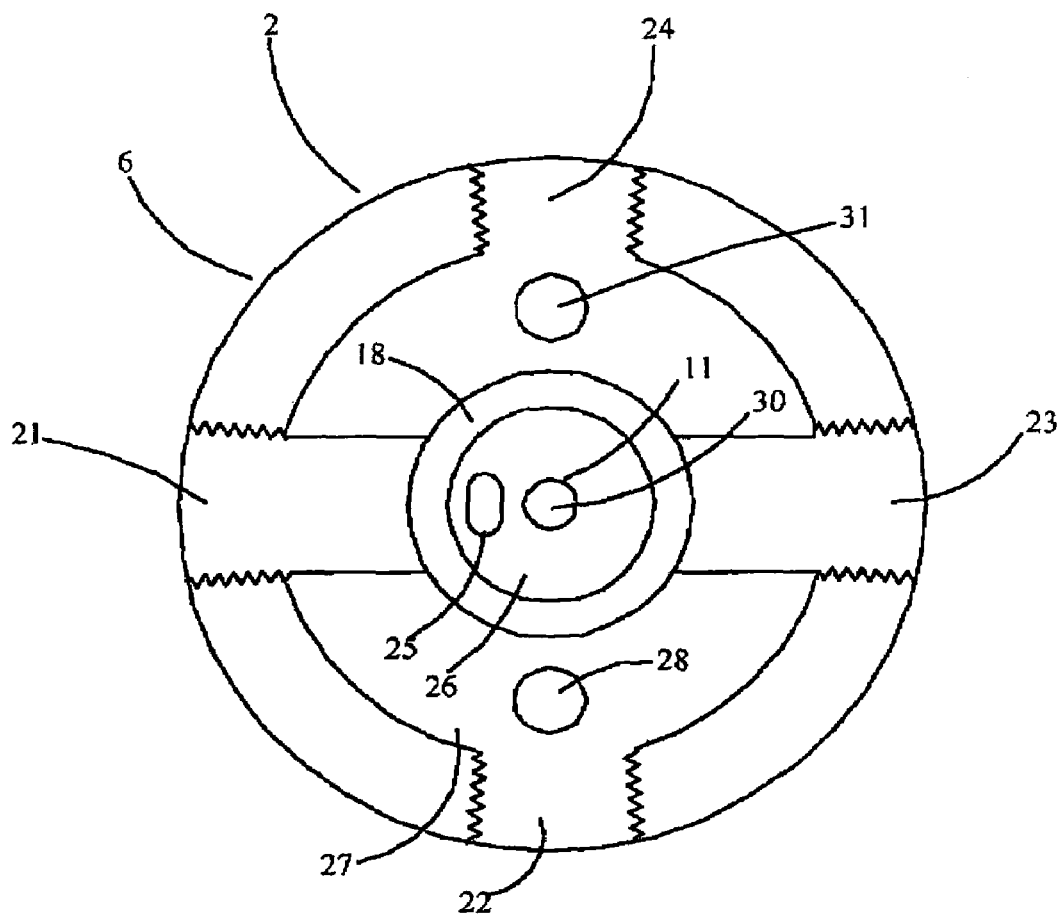

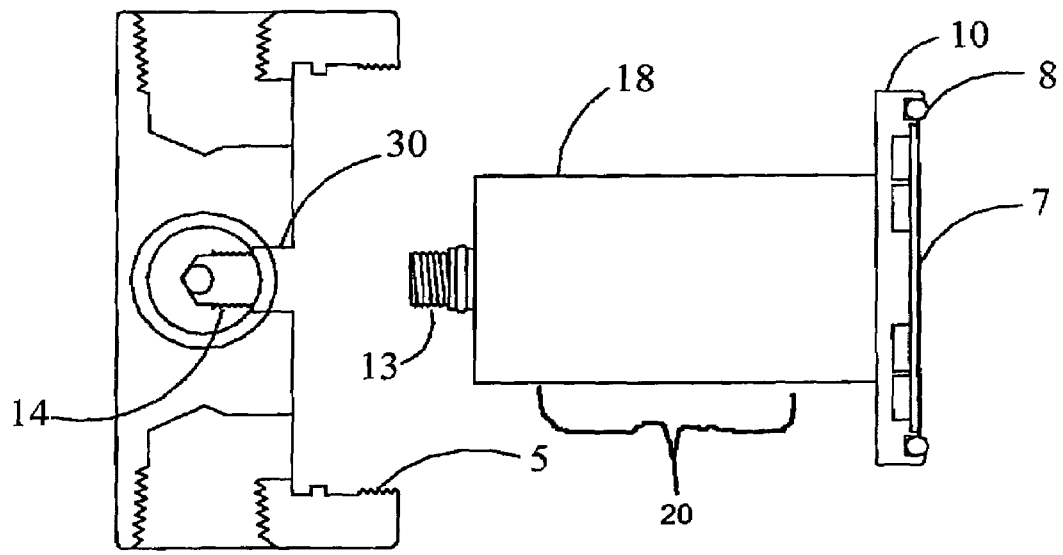
Figure# 7

COMBINATION DEPTH AND PHASE SEPARATION MEMBRANE FILTER

PRIORITY CLAIM

The present application claims the benefit of U.S. Provisional Patent Application No. 60/400,736, having a filing date of Aug. 2, 2002.

TECHNICAL FIELD OF THE INVENTION

The present invention relates filter systems, and particularly to a combination depth and phase separation membrane filter to remove entrained liquids and immiscible liquids from hydrocarbon gases, thereby protecting industrial analyzers from liquid and solid contamination, etc.

The preferred embodiment of the present invention contemplates a combined phase separation membrane filter and horizontally mounted depth filter in a horizontally mounted head and bowl configuration. The system is configured specifically for horizontal mounting, specifically filter configuration and layout, with all fitting connections situated in the head for ease of service, as well as providing a compact footprint.

GENERAL BACKGROUND OF THE INVENTION

The problems associated with filtering particles and removing undesirable entrained liquids from industrial process sample fluids have been historically solved by using a vertically mounted depth filter and/or an independent phase separation membrane filter. The phase separation membrane filter removes entrained liquids from gases and immiscible liquids from hydrocarbon liquids.

The phase separation membrane filter also provides a physical barrier to protect industrial analyzers from liquid and solid contamination even if other filtering components fail. However, the phase separation membrane filter is susceptible to particle loading and coating and frequently requires particulate filtration of sample fluids prior to membrane filtration.

The vertically mounted depth filter can remove particles from gas or liquid sample streams and coalesce entrained liquids from gases; however, it does not function as a physical barrier to protect analyzers, as does the membrane filter.

The use of two independent devices is frequently required to accomplish the filtering tasks of removing particles and undesirable entrained liquids from industrial process fluids. This requires the use of multiple fitting connections and a large amount of panel space. Proper fluid sampling techniques dictate the use of the least number of fittings and line connections.

In addition, the panel space dedicated for analyzer sample systems is a valuable commodity. Space in industrial facilities is limited, and in some cases cannot be expanded.

Therefore a single element combining the functions of the phase separation membrane filter and vertically mounted depth filter would be desirable since it would minimize panel space requirements and minimize interconnections and fittings.

A+ Corporation has manufactured horizontally mounted phase separation membrane filters since 1988 and horizontally mounted depth filters since 1997. Balston® has combined a vertically mounted phase separation membrane filter with its vertically mounted depth filter. However, this device must be vertically mounted because of the design of its internal passageways.

Vertical mounting requires multiple fitting connections to be removed before filtering elements in the device can be changed. The "liquid drain" of the device depends on vertical mounting and must have a fitting connection in the bottom of the vertically mounted bowl.

This fitting must be removed in order to remove the bowl to service the vertically mounted depth filter element. The "outlet" of the vertically mounted device is in the top of the device. A fitting connection must be removed in order to remove the cap and change the phase separation membrane filter element.

These fitting connections on both ends require a large amount of panel space, and they are an additional source of possible leakage and maintenance problems since they must be removed and replaced each time the unit requires service.

The prior art has therefore failed to provide a combination depth and phase separation membrane filter which is compact, leak resistant, and easily serviced, and which can be utilized in a horizontal orientation.

GENERAL SUMMARY DISCUSSION OF THE INVENTION

Unlike the prior art, the present invention provides a combination depth/phase separation membrane filter which is particularly designed for horizontal orientation, while providing a leak resistant, compact, easily serviced, easily installed, and highly effective in operation.

The invention, in summary, consists of a combined phase separation membrane filter with an integrated, horizontally mounted depth filter. Both a phase separation membrane filter and horizontally mounted depth filter are combined in a compact, horizontally mounted head and bowl arrangement. The internal passageways are designed specifically for horizontal mounting.

Horizontal mounting solves the problems mentioned previously in the prior art. All of the fitting connections are in the head, and no fitting connections need to be removed to service the device. Both phase separation membrane filter element and the horizontally mounted depth filter element can be easily replaced by removing the bowl without removing any fitting connections.

In addition, all of the fitting connections in the head are conveniently located at right angles allowing ease of panel access and panel tubing design. The device has small footprint requiring little panel space.

The invention will also solve problems associated with modular sample system designs that are limited to a very small stick or block designs. The invention will allow the combination of the phase separation membrane and the depth filter in a horizontally wall-mounted system. No prior art is believed to contemplate this combination in the modular sample system application of the device.

Variations of the invention include different sizes, porting, and internal volume.

It is therefore an object of the present invention to provide a horizontally mounted combination depth and phase separation membrane filter.

It is another object of the present invention to provide a combined depth and phase separation membrane filter in a compact footprint.

It is still another object of the present invention to provide a combined depth and phase separation membrane filter which is easily installed and serviced.

It is another object of the present invention to provide a combined depth and phase separation filter which is leak resistant and highly effective in operation.

Lastly, it is an object of the present invention to provide a combined depth and phase separation filter wherein the filters are arranged in a compact configuration within the bowl, with the head threadingly engaged thereto, the head including the fitting connections for ease in service.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein:

FIG. 1 is a side, partially cut-away view of the assembled combination filter system of the present invention.

FIG. 2 is a side, partially cut-away view of the disassembled combination filter element support structure unattached from the head.

FIG. 3 is a side, partially cut-away view of the disassembled combination filter with the filter element support structure attached to the head.

FIG. 5 is an exploded, side view of the combination filter system of the present invention.

FIG. 6 is a side, cross-section view of the head as seen from the bowl side.

FIG. 7 is a side, partially cut-away disassembled view of the combination filter with filter element support structure removed from the head, and the depth filter and phase separation membrane shown mounted thereon.

DETAILED DISCUSSION OF THE INVENTION

Referring to FIGS. 1–7, the invention consists of combining a vertical membrane phase separation element and a integrated horizontal depth or mechanical filter element, all situated in a single compact structure.

As shown, combination filter 1 is of a head 2 and bowl 3 design. Bowl 3 is attached to the head 2 by engaging male threads 4 into female threads 5 as shown in FIG. 4. O-ring 6 forms a seal between head 2 and bowl 3 when said head 2 and bowl 3 are assembled as shown in FIG. 1.

Continuing with FIGS. 1–7, phase separation membrane 7 is attached to the membrane receiver 10 (FIGS. 2, 3, and 4). Retention O-ring 8 retains phase separation membrane 7 into a groove, not shown, formed in the face of membrane receiver 10 end of filter element support structure 9. Depth filter element 18 is inserted over depth filter core 11 of filter element support structure 9 and fluid spring guide 12.

Fluid spring guide 12 supports depth filter element 18 to prevent it from collapsing in some type of service where there is a high pressure differential between its inner and outer surfaces. Fluid spring guide 12 also forms a spiraled fluid path in annulus 26 formed between the inner surface of depth filter element 18 and the outer surface of depth filter core 11 (FIG. 6).

Combination filter core assembly 20, shown in FIG. 7, is attached to head 2 as shown in FIG. 4 by engaging male threads 13 into female threads 14. O-ring 16 inserted into groove 19 (FIG. 9) forms a seal between outer of edge of passage 30 and filter element support structure 9.

OPERATION

In use, Sample Gas enters combination filter 1 (FIGS. 3 and 5) into port 21, flows through passage 25, annulus 26 formed by the inner surface of depth filter element 18 and the outer surface of depth filter core 11, through depth filter element 18 (FIG. 4) wherein particles are removed by filtration and coalescing of liquid droplets occur, then into annulus 27.

Coalesced liquid, if present, and a first portion of the gas sample flow into passage 28 and exits combination filter 1 from port 22 wherein it flows to a disposal area. Sample gas is often expended from port 22 in this manner to reduce sample transport time to an analyzer.

A second portion of the filtered and coalesced sample gas stream, after flowing into annulus 27, flows through phase separation membrane 7 wherein liquid, if present, is shed, and wherein said liquid also drains into annulus 27 therein passing through passage 28, and exiting combination filter 1 from port 22.

Sample gas, free of liquid after flowing through phase separation membrane 7, as previously described, then flows through passage 29 formed in the approximate center of filter element support structure 9 (FIG. 5), through passage 30, port 23 then to an external analyzer or other analytical device. Port 24 and passage 31 fluidly communicate with annulus 27 therefore port 24 can be utilized for any task requiring fluid communication with annulus 27 such as for installation of a pressure gauge to measure the annulus 27 pressure.

The use of a single cavity, such as annulus 27, to collect liquid coalesced by depth filter element 18 and phase separation membrane 7 reduces the complexity of the structure and increases its utility. Port 15 formed at the end of bowl 3 is also in fluid communication with annulus 27. A pressure gauge mounted in port 15 can easily be viewed.

A listing of the individual elements of the invention as referred to in the Figures follows:

| Description | Reference Number on Figures |
| --- | --- |
| Combination filter | 1 |
| Head | 2 |
| Bowl | 3 |
| Male threads on bowl | 4 |
| Female threads on bowl | 5 |
| Head/Bowl o-ring seal | 6 |
| Phase separation membrane | 7 |
| Retention o-ring for phase separation membrane | 8 |
| Filter element support structure | 9 |
| Membrane receiver | 10 |
| Depth filter core | 11 |
| Fluid guide spring | 12 |
| Male threads for filter element support | 13 |
| Female threads for filter element support | 14 |
| Port | 15 |
| O-ring | 16 |
| Membrane support | 17 |
| Depth or mechanical filter element | 18 |
| O-ring groove | 19 |
| Combination filter core assembly | 20 |
| Port | 21 |
| Port | 22 |
| Port | 23 |
| Port | 24 |

-continued

| Description | Reference Number on Figures |
| --- | --- |
| Passage | 25 |
| Annulus | 26 |
| Annulus | 27 |
| Passage | 28 |
| Passage | 29 |
| Passage | 30 |
| Passage | 31 |

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A filter comprising:
a head assembly,
a filter assembly, comprising:
a filter element support structure comprising a depth filter core having first and second ends and a length, said first end configured to engage said head assembly, said depth filter core further having a passage formed along its length, providing a depth filter core passage;
a membrane receiver mounted to said second end of said depth filter core, said membrane receiver formed to communicate with said depth filter core passage;
a coalescing depth filter enveloping said depth filter core;
a phase separation membrane situated in said membrane receiver in a transverse position with respect to said coalescing depth filter;
a bowl formed to engage said head assembly to form a housing, said housing formed to envelope said filter assembly in fluid impermeable fashion
whereby gas passing through said coalescing depth filter is then filtered by said phase separation membrane, which gas is then directed through said depth filter core passage to said head assembly.

2. The filter of claim 1 wherein said membrane receiver supports said phase separation membrane in a transverse position relative to said depth filter core.

3. The filter of claim 2 wherein said coalescing depth filter is formed to coalesce liquid from, as well as to filter, a gas stream, so as to provide coalesced liquid, and wherein said head assembly has formed therein a passage to receive and drain said coalesced liquid.

4. The filter of claim 3 wherein said depth filter core is elongated and is threadingly affixed to said head.

5. The filter of claim 3 wherein said depth filter core has situated thereabout a coiled spring.

6. The filter of claim 5, wherein said coalescing depth filter envelopes said coiled spring and said depth filter core.

7. The filter of claim 6, wherein said coiled spring forms a fluid guide between said depth filter core and said coalescing depth filter.

8. The filter of claim 2 wherein said membrane receiver is supported in an approximate 90° relationship relative to said depth filter core.

9. The filter of claim 8 wherein liquid rejected by said phase separation membrane exits said housing by way of a port positioned in a lower region of said housing.

10. A filter comprising:
a head assembly;
a filter assembly, comprising:
a filter element support structure comprising a depth filter core having first and second ends and a length, said depth filter core having a passage formed longitudinally therethrough, so as to provide a depth filter core passage;
a coalescing depth filter enveloping said depth filter core;
a phase separation membrane situated in transverse position with respect to said coalescing depth filter,
said phase separation membrane situated such that gas filtered therethrough is directed through said depth filter core passage;
a housing formed to contain said coalescing depth filter and said phase separation membrane;
whereby liquid entrained in gas passing through said coalescing depth filter coalesces and is drained, providing filtered gas, said filtered gas then passing through said phase separation membrane.

11. The filter of claim 10 wherein said housing is of a head and bowl design.

12. The filter of claim 10 wherein said coalescing depth filter and said phase separation membrane are situated on a common support structure.

13. The filter of claim 12 wherein said coalescing depth filter is horizontally situated.

14. The filter of claim 13 wherein a spring envelopes said depth filter core, said spring being enveloped by said coalescing depth filter.

15. The filter of claim 14 wherein said spring forms a fluid passage between said depth filter core and said coalescing depth filter.

16. The filter of claim 15 wherein said spring comprises a coiled spring, and said coiled spring forms a fluid guide.

17. The filter of claim 10 wherein said phase separation membrane is in an approximate 90° relationship with said depth filter core.

18. The filter of claim 10 wherein liquid coalesced by said coalescing depth filter exits said housing by way of a port positioned in a lower region of said housing.

19. The filter of claim 10 wherein liquid rejected by said phase separation membrane exits said housing by way of a port situated in a lower region of said housing.

20. The filter of claim 10 wherein liquid coalesced by said coalescing depth filter and liquid rejected by said phase separation membrane exits said filter housing through a common port.

21. The filter of claim 20 wherein said common port is positioned below said depth filter core.

* * * * *